(12) United States Patent
Canfield et al.

(10) Patent No.: US 8,310,216 B2
(45) Date of Patent: Nov. 13, 2012

(54) SYNCHRONOUS RECTIFIER CONTROL FOR SYNCHRONOUS BOOST CONVERTER

(75) Inventors: John Christopher Canfield, Newmarket, NH (US); David Charles Salerno, New Boston, NH (US)

(73) Assignee: Linear Technology Corporation, Milpitas, CA (US)

( * ) Notice: Subject to any disclaimer, the term of this patent is extended or adjusted under 35 U.S.C. 154(b) by 0 days.

(21) Appl. No.: 13/251,852

(22) Filed: Oct. 3, 2011

(65) Prior Publication Data

US 2012/0019228 A1   Jan. 26, 2012

Related U.S. Application Data

(62) Division of application No. 11/727,497, filed on Mar. 27, 2007, now Pat. No. 8,063,615.

(51) Int. Cl.
*G05F 1/613* (2006.01)
(52) U.S. Cl. .......................... 323/223; 363/127; 323/233
(58) Field of Classification Search .................. 323/222, 323/223, 225, 233; 363/127
See application file for complete search history.

(56) References Cited

U.S. PATENT DOCUMENTS

| 5,721,483 | A | 2/1998 | Kolluri et al. |
| 6,998,825 | B2 | 2/2006 | Nagaoka et al. |
| 7,148,668 | B1 | 12/2006 | Collins |
| 2003/0222627 | A1* | 12/2003 | Hwang .......................... 323/222 |

OTHER PUBLICATIONS

English translation of the Chinese Office Action issued in Chinese Patent Application No. 200810084563.8 dated Dec. 13, 2011.

* cited by examiner

*Primary Examiner* — Harry Behm
*Assistant Examiner* — Matthew Grubb
(74) *Attorney, Agent, or Firm* — McDermott Will & Emery LLP

(57) ABSTRACT

A synchronous boost DC/DC conversion system comprises an input for receiving a DC input voltage, an output for producing a DC output voltage, a power switch controllable to adjust an output signal of the conversion system, and an inductor coupled to the input. A synchronous rectifier is configurable to create a conduction path between the inductor and the output to provide the inductor discharge. A control circuit is provided for controlling the synchronous rectifier as the input voltage approaches the output voltage, so as to adjust average impedance of the conduction path over a discharge period of the inductor.

24 Claims, 8 Drawing Sheets

BACKGROUND

BACKGROUND

BACKGROUND

BACKGROUND

SYNCHRONOUS RECTIFIER CONTROL FOR SYNCHRONOUS BOOST CONVERTER

RELATED APPLICATIONS

This application is a Divisional of U.S. application Ser. No. 11/727,497, filed on Mar. 27, 2007, the disclosure of which is hereby incorporated by reference.

TECHNICAL FIELD

The subject matter of this disclosure relates to power supply circuits, and more particularly to circuitry and methodology for controlling a synchronous rectifier in a synchronous boost converter.

BACKGROUND

In a conventional boost converter, the voltage Vout at its output is generally significantly larger than the voltage Vin at its input. Pulse Width Modulation (PWM) is used to control a power switch of the converter to regulate the output voltage Vout. In steady state operation, the duty cycle D of the power switch is given by:

$$D = \frac{Vout - Vin}{Vout}.$$

As the input voltage Vin approaches the output voltage Vout, the duty cycle D decreases to zero. However, in practice, all physical converters have some finite minimum on-time. In voltage mode control, the minimum on-time can be made quite small, but in current mode control, the minimum on-time is generally significantly longer because it includes a blanking period and a delay period of the current sensing PWM comparator. Typically, in current mode control, the minimum on-time is at least 50 ns and is often 100 ns or more. Eventually, as Vin approaches Vout, the minimum on-time becomes too large to create the required duty cycle. At this point, the boost converter will begin bursting on and off to achieve the required small duty cycle on average by alternating periods with no switching and periods of near minimum duty cycle switching. However, since the input-output voltage difference is very small, the inductor discharges very little during the synchronous rectifier on-time. As a result, the inductor current builds up during each near minimum on-time pulse of the power switch, but discharges only slightly during the remainder of the period. Over the course of the several switching cycles in a burst, the inductor current builds up significantly, and then discharges to the output during the non-switching part of the burst. This leads to large inductor current excursions and substantial output voltage ripple.

FIGS. 1A-1D illustrate simulation of a conventional synchronous boost converter exhibiting this bursting behavior in low overhead operation. In this example, Vin=3.95V and Vout=4.00V. Other parameters of the converter are selected as follows: inductance of the inductor is equal to 4 μH, capacitance of the output capacitor is equal to 4.7 μF, switching frequency is 1 MHz, and the minimum on-time period is 90 ns. At the left edge of the plot, the output voltage Vout (FIG. 1A) begins above the 4.0V regulation voltage and gradually falls below the regulation voltage. At this point, the voltage Vcomp (FIG. 1C) at the output of the error amplifier ramps up sharply and the power switch begins turning on for short durations, near the minimum on-time of 90 ns, as illustrated by switch voltage Vsw in FIG. 1B. After several cycles, the inductor current $I_L$, (FIG. 1D) has built up substantially due to the very small slope of the inductor discharge (which is due to the fact that there is only a 50 mV voltage across the inductor during this portion of the switching period). Eventually, the increased inductor current drives the output voltage up and the error amplifier output decreases. Once the commanded on-time of the power switch falls below 90 ns (the minimum on-time), all switching stops and the inductor discharges its built-up current into the output causing the output voltage to substantially over-shoot the regulation voltage. This behavior generally leads to undesirably large output voltage ripple.

The point of onset of this behavior is dependent upon the power switch minimum on-time, the total series resistance of the inductor discharge path (inductor resistance and synchronous rectifier resistance), and the switching frequency. Higher series resistance will improve the situation by providing greater reverse voltage to reset the inductor current during the discharge phase. Higher switching frequencies increase the likelihood of this problem since the same minimum on-time translates into a larger duty cycle given the shorter switching period.

Currently, some of the synchronous boost DC/DC converters manufactured by Linear Technology Corporation, the assignee of the present application, eliminate this problem by completely disabling the synchronous rectifier when the overhead voltage (Vout-Vin) is less than some small threshold voltage (e.g. 200 mV). This threshold is chosen as the overhead voltage that still provides sufficient reset of the inductor current in the worst case. With the synchronous rectifier disabled, the reverse voltage across the inductor is increased substantially, resulting in sufficient inductor discharge during each cycle to eliminate the undesired bursting behavior. In addition, with the synchronous rectifier disabled, the effective output voltage is greater, thereby requiring the converter to run at a duty cycle that is greater then the minimum on-time. The disadvantage of this approach is that it results in a drastic drop in efficiency at the point where the synchronous rectifier is disabled.

It is noted that the bursting behavior described above resembles the pulse skipping behavior of DC/DC converters operating in a discontinuous conduction mode at a light load. However, in the case of converters operating in a discontinuous conduction mode, the minimum on-time is reached due to a light load rather then due to the input voltage being close to the output voltage. Also, in a discontinuous conduction operation, the pulse skipping behavior does not result in a significant output voltage ripple since the inductor is fully reset each switching period and the inductor current is not able to build up as it does in low overhead operation. Generally, pulse skipping due to deep discontinuous operation is not a significant performance problem, unlike the bursting in low overhead operation of boost converters.

Hence, it would be desirable to eliminate the low voltage overhead bursting behavior of boost converters and its associated current and voltage ripple while still maintaining high-efficiency operation.

SUMMARY OF THE DISCLOSURE

In accordance with the present disclosure, a synchronous boost DC/DC conversion system comprises an input for receiving a DC input voltage, an output for producing a DC output voltage, a power switch controllable to regulate an output signal of the conversion system, and an inductor coupled to the input. When the power switch is on, the output is isolated from the input, and the input voltage charges the inductor increasing the current flowing through it. A synchronous rectifier is configurable to provide a conduction path between the inductor and the output to discharge the inductor when the power switch is off. A control circuit is provided for controlling the synchronous rectifier as the input voltage approaches and exceeds the output voltage, so as to adjust the average impedance of the conduction path over a discharge period of the inductor.

In particular, the control circuit may continuously or incrementally increase the average impedance as the input voltage approaches and exceeds the output voltage.

In accordance with one aspect of the disclosure, the control circuit may adjust the average impedance in accordance with a difference between the output voltage and the input voltage.

In accordance with another aspect of the disclosure, the control circuit may be configured to adjust the average impedance in accordance with a conduction period of the power switch.

The synchronous rectifier may comprise a synchronous switch provided between the inductor and the output. The control circuit may gradually reduce a conduction period of the synchronous switch as the input voltage approaches and exceeds the output voltage.

If the synchronous switch contains a MOS element, the control circuit may gradually decrease a gate-to-source voltage of the MOS element as the input voltage approaches and exceeds the output voltage.

If the synchronous switch contains a P-Channel MOSFET element, the control circuit may turn on the switch on for a portion of the cycle. During the remainder of the cycle, the gate of the MOSFET element may be connected to receive the input voltage, in this manner ensuring sufficient voltage drop to reset the inductor current.

In accordance with an embodiment of the disclosure, the control circuit may supply a pulse-width modulation (PWM) signal to the synchronous switch so as to reduce a conduction period of the synchronous switch as the input voltage approaches and exceeds the output voltage.

In particular, the control circuit may comprise a pulse width modulator for producing the PWM signal having a duty cycle variable with a threshold voltage that corresponds to a difference between the input voltage and the output voltage. The threshold voltage may be proportional to a difference between the input voltage and a sum of the output voltage and an offset voltage. The control circuit may comprise a transconductance amplifier for generating output current proportional to the threshold voltage.

The pulse width modulator may comprise a comparator for comparing a sawtooth signal with a signal corresponding to the threshold voltage to produce a signal for controlling the synchronous rectifier.

In accordance with another embodiment, the control circuit may comprise multiple switching elements controllable in accordance with a difference between the output voltage and the input voltage. The switching elements may be controlled in accordance with data in a look-up table containing control values corresponding to predetermined differences between the output voltage and the input voltage.

In accordance with a further embodiment, the control circuit may disable the synchronous rectifier for duration of time corresponding to a conduction period of the power switch. In particular, the synchronous rectifier may be disabled for duration of time proportional to a difference between the conduction period of the power switch and a pre-set time period.

In accordance with a method of the disclosure, the following steps are carried out for converting a DC input voltage into a DC output voltage using a power switch, inductor and a synchronous rectifier:

controlling the power switch to adjust the output voltage, and as the input voltage approaches the output voltage, adjusting the average impedance of the synchronous rectifier over a discharge period of the inductor.

The average impedance may be adjusted in accordance with a difference between the output voltage and the input voltage.

Alternatively, the average impedance may be adjusted in accordance with a conduction period of the power switch.

The average impedance may be adjusted so as to continuously or incrementally increase the average impedance as the input voltage approaches and exceeds the output voltage. In particular, a conduction period of the synchronous rectifier may be gradually reduced as the input voltage approaches and exceeds the output voltage.

Additional advantages and aspects of the disclosure will become readily apparent to those skilled in the art from the following detailed description, wherein embodiments of the present disclosure are shown and described, simply by way of illustration of the best mode contemplated for practicing the present disclosure. As will be described, the disclosure is capable of other and different embodiments, and its several details are susceptible of modification in various obvious respects, all without departing from the spirit of the disclosure. Accordingly, the drawings and description are to be regarded as illustrative in nature, and not as limitative.

BRIEF DESCRIPTION OF THE DRAWINGS

The following detailed description of the embodiments of the present disclosure can best be understood when read in conjunction with the following drawings, in which the features are not necessarily drawn to scale but rather are drawn as to best illustrate the pertinent features, wherein.

DETAILED DESCRIPTION OF THE EMBODIMENTS

The present disclosure will be made using specific examples of circuits for controlling conduction of a synchronous rectifier in a synchronous boost converter when the input voltage approaches and exceeds the output voltage. It will become apparent, however, that the concept of the disclosure is applicable to any circuitry for controlling the average impedance of a synchronous rectifier in a switching circuit.

Figure 1A:
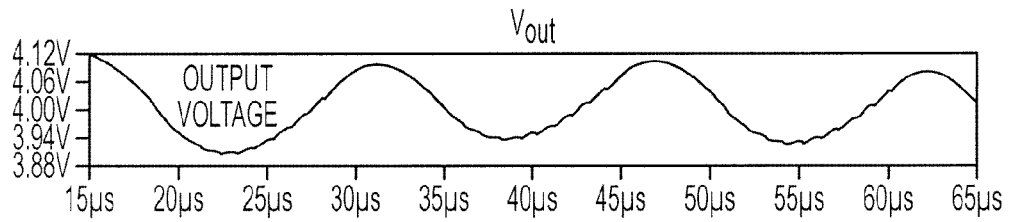
FIGS. 1A-1D illustrate simulation of a conventional boost converter operating in a low overhead condition.
Figure 1B:
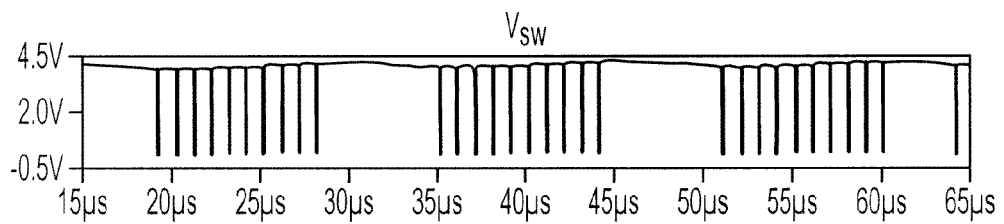
Figure 1C:
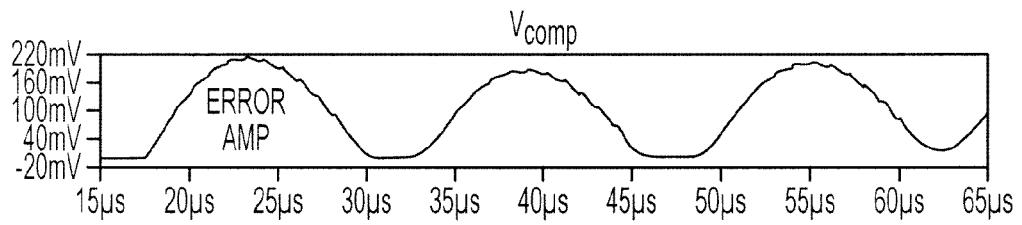
Figure 1D:
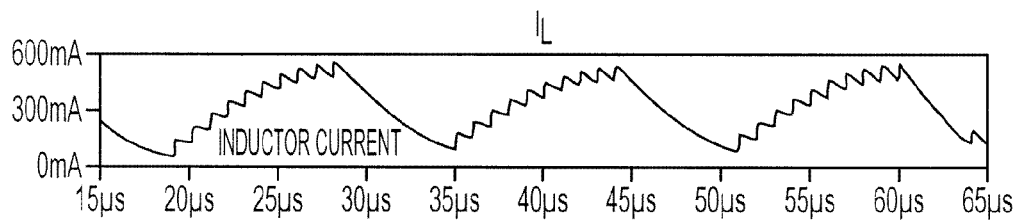
Figure 2:
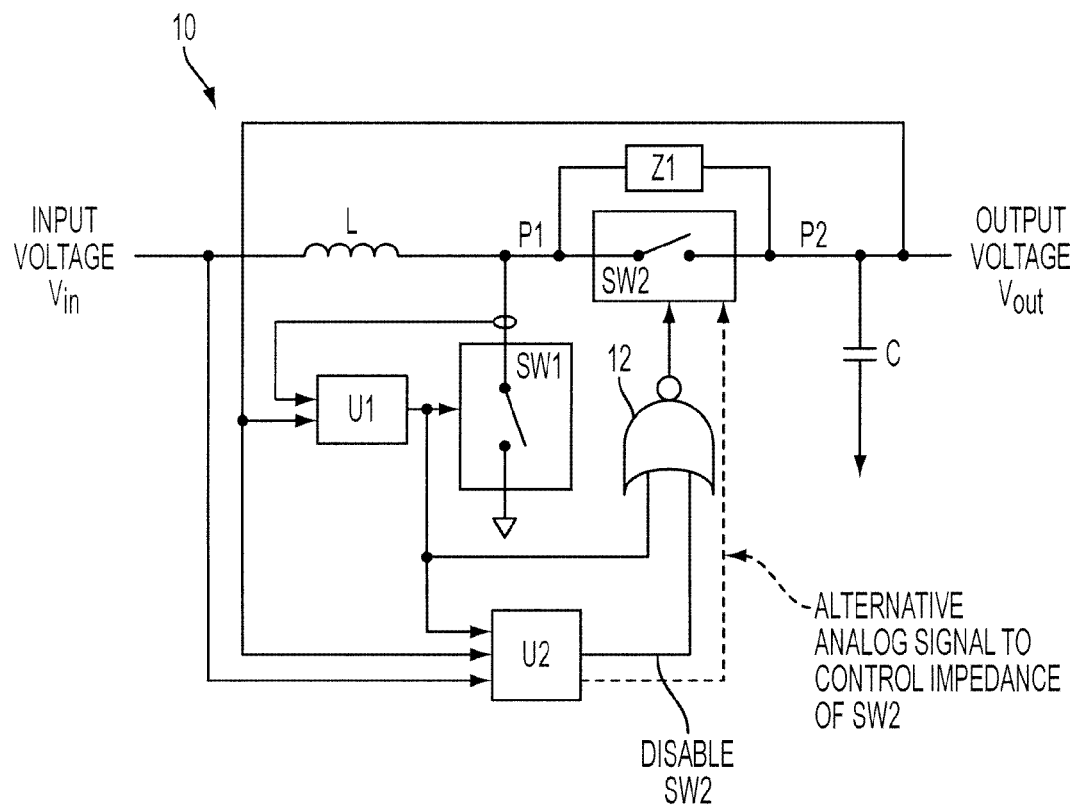
FIG. 2 shows a block-diagram of an exemplary synchronous boost DC/DC converter in accordance with the present disclosure.

FIG. 2 shows a conceptual block diagram of a synchronous boost DC/DC converter 10 of the present disclosure that produces an output voltage Vout at its output in response to an input voltage Vin supplied to its input. The boost converter 10 comprises main power switch SW1, synchronous rectifier SW2, inductor L and output capacitor C. The main power switch SW1 is controlled by feedback control circuit U1 that adjusts the duty cycle of SW1 in order to regulate or otherwise control the output voltage. For example, the control circuit U1 may use voltage mode control or current mode control for adjusting the output signal of the converter 10. The synchronous rectifier SW2 may be a switch arranged between the inductor L and the output to provide a low-resistance conductance path across an inductor discharge circuit of the boost converter 10 for improving its power conversion efficiency. The main switch SW1 and synchronous rectifier SW2 may be implemented using such controllable elements as MOSFET transistors, DMOS transistors, and bipolar transistors. For example, the main power switch SW1 may be an N-channel MOSFET switch, and the synchronous rectifier SW2 may be a P-channel MOSFET switch.

Impedance Z1 may be connected in parallel to the synchronous rectifier SW2. The impedance Z1 may be larger than the impedance of the synchronous rectifier SW2 when SW2 is in a conducting state. If SW2 is implemented as a P-channel MOSFET element, Z1 may be the body diode of the MOSFET element. Also, Z1 may be implemented as a fixed resistance, an electronic switch, a combination of individual impedances, such as a diode in series with a resistance, or any other shunt that provides a current path having impedance greater than the impedance of the synchronous rectifier SW2 when SW2 is in a conducting state.

Alternatively, the converter 10 may operate without the impedance Z1. In particular, if SW2 is implemented as a P-Channel MOSFET, it may be configured such that during the SW2 switch off-time its gate is tied to Vin. In this manner, SW2 itself, rather than an external path, provides a high impedance discharge path to reset the inductor current.

Control circuit U2 may adjust the average impedance of the conduction path created by the synchronous rectifier SW2 between the inductor L and the output to provide discharge of the inductor L. The average impedance may be defined as an average value of the conduction path impedance over a discharge period of the inductor L. If impedance Z1 is connected across SW2, U2 may adjust the average impedance of the path provided by the parallel combination of SW2 and Z1. As discussed in more detail later, as the input voltage Vin approaches and exceeds the output voltage Vout, the circuit U2 incrementally or continuously increases the average impedance between points P1 and P2 (FIG. 2) in order to ensure sufficient reverse voltage to reset the inductor current. The impedance adjustment may take place in a closed-loop or open-loop fashion. If the rectifier SW2 is a MOSFET switch, the circuit U2 may gradually decrease the gate-to-source voltage applied to the MOSFET element as the input voltage approaches and exceeds the output voltage.

Figure 3A:
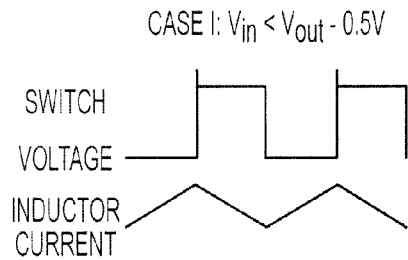
FIGS. 3A-3C show waveforms illustrating operation of the boost converter in accordance with the present disclosure.
Figure 3B:
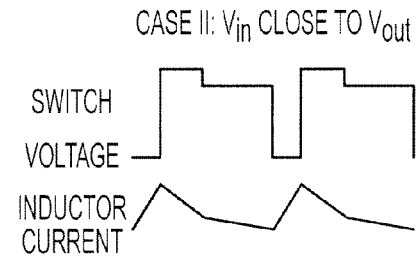
Figure 3C:
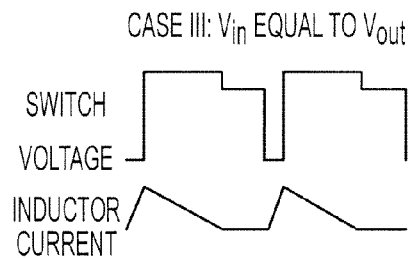

Alternatively, the synchronous rectifier SW2 may be turned off for a duration that is just sufficient to reset the inductor current and then may be turned on for the remainder of the period. In this manner, the inductor current is reset sufficiently to eliminate the bursting behavior, but the synchronous rectifier SW2 remains on for the greatest extent possible to optimize efficiency. Switching waveforms illustrating this approach are shown in FIGS. 3A-3C.

In normal operation when input voltage Vin is significantly less than output voltage Vout (FIG. 3A), the converter operates as a traditional boost converter and the synchronous rectifier remains on for the entire discharge phase (except possibly for a very brief duration during the non-overlap period of switches SW1 and SW2). When the input voltage Vin is close to the output voltage Vout (FIG. 3B), the duty cycle of SW1 begins to approach the minimum on-time of SW1. In this situation, the synchronous rectifier SW2 remains off for a portion of the discharge phase in order to reset the inductor current, but then turns on for the remainder of the discharge period to optimize efficiency. When Vin becomes equal to Vout (FIG. 3C), the synchronous rectifier SW2 remains off (conducts through the element Z1) for a much longer duration in order to still reset the inductor current. In each of these cases, the synchronous rectifier SW2 is only turned off for the duration of the switching cycle necessary to reset the inductor current, thereby optimizing the efficiency by keeping the synchronous rectifier conducting for the longest extent possible.

The output of control circuit U2 may be a digital signal that controls the time interval during which SW2 conducts. Alternatively, the circuit U2 may produce an analog signal that directly controls the impedance of the rectifier SW2. If the converter 10 operates in a discontinuous conduction mode (DCM), the circuit U2 may sense the current through SW2 and disable SW2 when the current falls below a predetermined threshold that may be set near a zero level.

To enable various ways of controlling SW2 described in more detail later, a logic circuit 12, such as a NOR gate, may be provided between the control circuit U2 and the synchronous rectifier SW2. The logic circuit 12 may have one input connected to the output of the circuit U2, another input connected to the output of control circuit U1, and an output for controlling the synchronous rectifier SW2.

Figure 4:
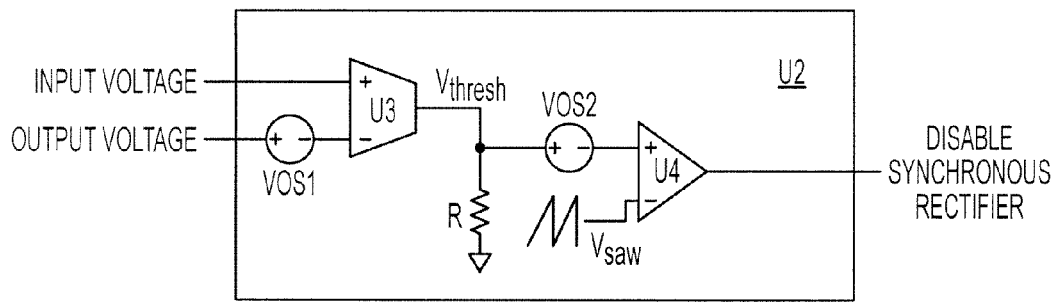
FIG. 4 illustrates an exemplary embodiment of a circuit for controlling a synchronous rectifier in accordance with the present disclosure.

In accordance with an exemplary embodiment of the disclosure shown in FIG. 4, the control circuit U2 may provide PWM control of the synchronous rectifier SW2 based on a difference between the input voltage Vin and the output voltage Vout. In particular, the circuit U2 may comprise a transconductance amplifier U3 having a non-inverting input supplied with the input voltage Vin and an inverting input responsive to the output voltage Vout. A source of offset voltage VOS1 may be inserted between the output voltage terminal and the inverting input of U3. The transconductance amplifier U3 generates an output current proportional to a voltage difference at its inputs.

Threshold voltage Vthresh is produced at resistor R coupled to the output of the transconductance amplifier U3. The threshold voltage Vthresh corresponding to a voltage difference at the inputs of U3 may be defined as follows:

$$Vthresh = \frac{Gm}{R}(Vin - Vout + VOS1),$$

where Gm is the transconductance of the transconductance amplifier U3, and R is the resistance of the resistor R. Hence, the threshold voltage Vthresh increases as the input voltage Vin approaches and exceeds the output voltage Vout.

A high-gain comparator U4 may be coupled to the output of U3 to perform pulse width modulation. A source of offset voltage VOS2 may be inserted between a non-inverting input of U4 and the output of U3. An inverting input of U4 is supplied with a sawtooth signal Vsaw. The output of U4 produces a square wave signal having the duty cycle that varies with the threshold voltage Vthresh.

For Vthresh=0V, the small offset voltage VOS2 ensures that the output of U4 is continuously low and the synchronous rectifier SW2 is not disabled at all. As Vthresh increases above VOS2, the conduction period of the synchronous rectifier SW2 gradually reduces so that synchronous rectifier SW2 is gradually disabled for longer and longer periods. When Vthresh exceeds the peak voltage of the sawtooth signal Vsaw, the synchronous rectifier SW2 becomes continuously disabled. When the synchronous rectifier SW2 is disabled, electrical conduction between points P1 and P2 (FIG. 2) is provided only through element Z1, such as the body diode of the P-channel MOSFET that may be used to implement SW2.

Accordingly, as the input voltage Vin approaches and exceeds the output voltage Vout, the control circuit U2 in FIG. 4 performs PWM control of the synchronous rectifier SW2 so as to gradually increase the average impedance of SW2 over an inductor discharge period.

Figure 5:
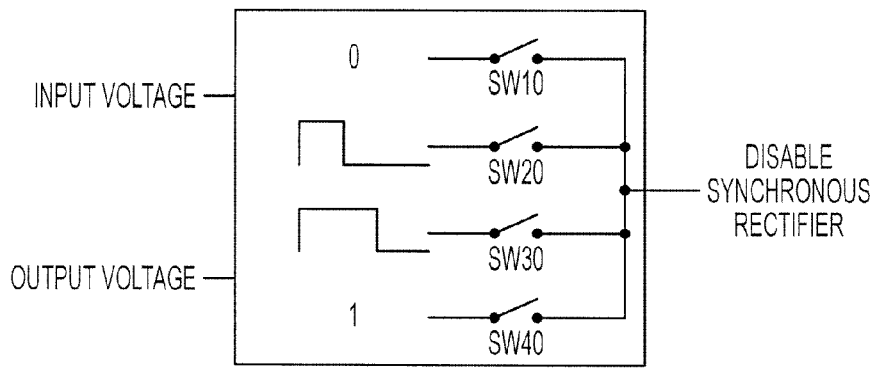
FIG. 5 illustrates another exemplary embodiment of a circuit for controlling a synchronous rectifier in accordance with the present disclosure.

In accordance with another exemplary embodiment of the present disclosure illustrated in FIG. 5, the control circuit U2 may include a set of multiple switches connected in parallel between an input responsive to a difference between the output voltage Vout and the input voltage Vin, and an output that produces a control signal for controlling a conduction period of the synchronous rectifier SW2. For example, the set of switches may include switches SW10, SW20, SW30 and SW40.

A look-up table may be provided to maintain values for controlling the switches SW10-SW40. For a particular range of a difference between Vout and Vin, the look-up table may contain a respective preprogrammed control value that turns on a particular switch or a combination of switches to generate a desired synchronous rectifier control signal. The ranges of differences between Vout and Vin may be selected for particular applications. For example:
- if (Vout-Vin) exceeds 0.2V, switch SW10 may be turned on to produce a control signal that would maintain the synchronous rectifier SW2 in an on-state for entire discharge state;
- if (Vout-Vin) is in the range between 0.2V and 0.0V, switch SW20 may be turned on to produce a control signal that would reduce a conduction period of SW2 so as to disable SW2 for a predetermined time period selected to reset the inductor current in the worst case during a switching cycle;
- if (Vout-Vin) is in the range between 0.0V and −0.5V, switch SW30 may be turned on to reduce a conduction period of SW2 so as to disable SW2 for a longer time period during a switching cycle;
- if (Vout-Vin) is less than −0.5V, switch SW40 may be turned on to produce a control signal that would continuously disable SW2.

Hence, as the input voltage Vin approaches and exceeds the output voltage Vout, the control circuit U2 of FIG. 5 incrementally reduces the conduction period of SW2 so as to gradually increase the average impedance of the SW2 conduction path over an inductor discharge period.

Figure 6:
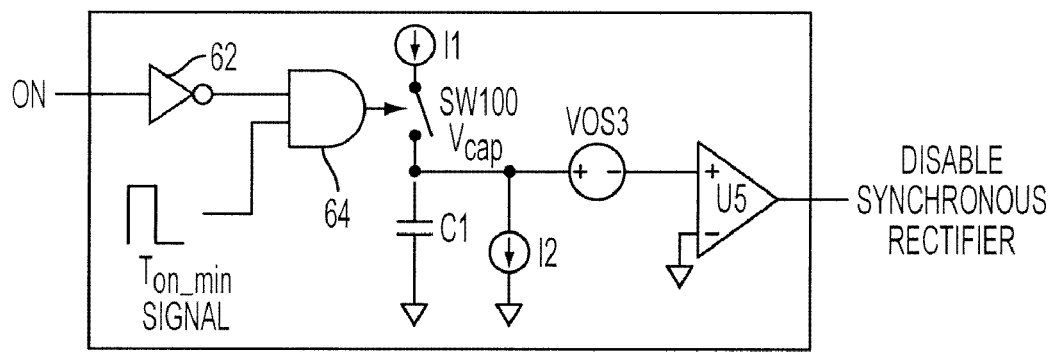
FIG. 6 illustrates a further exemplary embodiment of a circuit for controlling a synchronous rectifier in accordance with the present disclosure.

In accordance with a further exemplary embodiment shown in FIG. 6, the control circuit U2 controls the synchronous rectifier SW2 based on the on-time period of the power switch SW1. In particular, the control circuit U2 may include an input logic circuit composed of inverter 62 and an AND gate 64. A first input of the AND gate 64 is coupled to the inverter 62 supplied with an On signal (FIG. 7) that represents an on-time period of the switch SW1, i.e. the period when the switch SW1 is on during a switching cycle. A second input of the AND gate 64 is supplied with a Ton_min signal (FIG. 7), which is a fixed pulse starting at the beginning of the switching cycle of SW1 and having a predetermined minimum duration Tmin. The Ton_min signal defines the duty cycle D at which the synchronous rectifier SW2 begins turning off. The Tmin duration may be set at a value greater then the minimum on-time period of SW1 expected in the worst case.

The output of the AND gate 64 controls switch SW100 that connects a current source I1 to capacitor C1. A current source I2 is connected in parallel to the capacitor C1. Via a source of offset voltage VOS3, the capacitor C1 and the current source I2 are connected to the non-inverting input of a comparator U5. The inverting input of U5 may be grounded.

Figure 7:
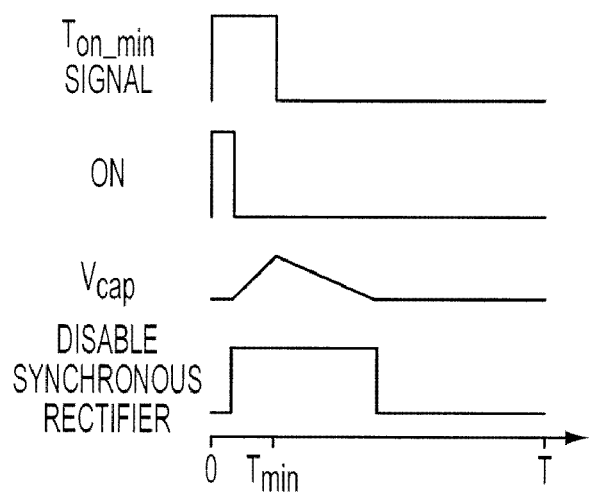
FIG. 7 shows waveforms illustrating operation of the control circuit in FIG. 6.

As illustrated by waveforms in FIG. 7, if the power switch SW1 turns off before Tmin, capacitor C1 begins charging at a fixed rate set by the current source I1 (the capacitor voltage Vcap increases). Then, at time Tmin, the capacitor C1 begins discharging at a rate set by the current source I2. Over the entire duration for which the voltage Vcap is greater than zero, the synchronous rectifier SW2 is disabled and conducts only via the element Z1 such as the body diode of a PMOS switch. The offset voltage VOS3 provides the comparator U5 with a slight offset to maintain its output at a low level when the capacitor C1 is discharged to ground.

When the on-time period of the power switch SW1 is greater then Tmin, the capacitor C1 does not charge, and the synchronous rectifier SW2 will not be disabled at all. In this case, the synchronous rectifier SW2 remains on for the entire inductor discharge cycle.

However, if the on-time period of SW1 does not exceed T min, the synchronous rectifier SW2 turns off for a portion of the inductor discharge cycle. As Vin approaches Vout, the on-time period of the power switch SW1 becomes shorter, and the synchronous rectifier SW2 turns off for longer portions of inductor discharge cycles. Therefore, the duration during which the synchronous rectifier SW2 is disabled is proportional to a difference between Tmin and the on-time of SW1. As the on-time period of SW1 gets shorter, the duration during which the synchronous rectifier SW2 is disabled will get longer to prevent the on-time period of SW1 from reaching the minimum on-time Tmin. The ratio between values of currents I1 and I2 determines the relationship between the conduction period of the synchronous rectifier SW2 and the amount by which the on-time period of SW1 is shorter then Tmin. This ratio may be selected so as to provide the conduction period of SW2 sufficiently long to reset the inductor current in the worst case taking into account the lowest power circuit series resistance and the largest minimum on-time period of SW1.

Figure 8A:
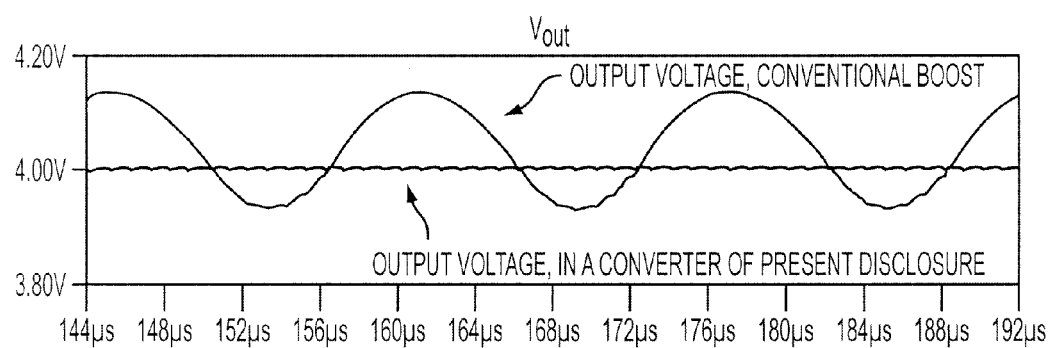
FIGS. 8A and 8B illustrate performance enhancement of the boost converter of the present disclosure compared with a conventional boost converter.
Figure 8B:
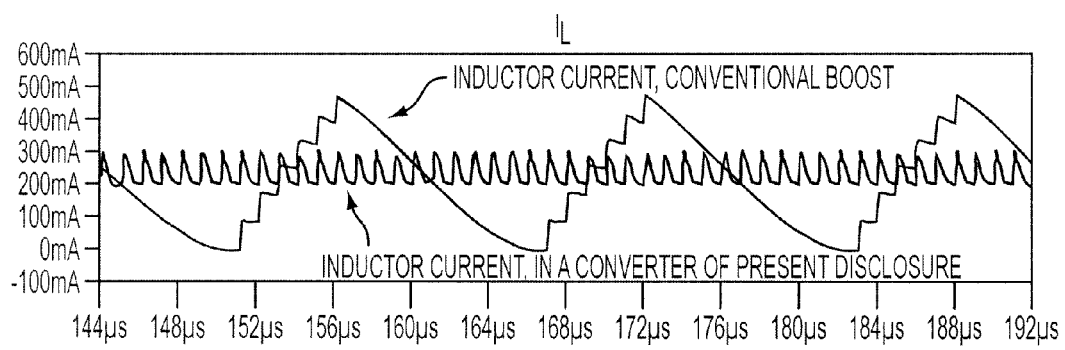

FIGS. 8A and 8B illustrate the performance enhancement obtained due to the synchronous rectifier control of the present disclosure by comparing simulation of a conventional boost converter in low overhead operation and a similar boost converter using the synchronous rectifier control circuit shown in FIG. 6. Both converters have the same circuit parameters (inductance of inductor L equal to 4 µH, capacitance of output capacitor C equal to 4.7 µF, switching frequency of 1 Mhz, load current $I_{LOAD}$ of 200 mA, and a minimum on-time period of 90 ns) and both are operating with low overhead voltage (Vin=3.95V, Vout=4.0V).

As shown in FIGS. 8A and 8B, control of the synchronous rectifier conduction period in accordance with the present disclosure leads to complete elimination of the bursting behavior, resulting in much lower variation of inductor current $I_L$ and greatly reduced ripple of output voltage Vout. In this example, the synchronous rectifier SW2 remains off for approximately 450 ns during the inductor discharge cycle to provide sufficient reset of the inductor current. However, the synchronous rectifier SW2 is still on for a significant portion of the inductor discharge cycle. As a result, power conversion efficiency is substantially improved compared to converters in which the synchronous rectifier is disabled continuously.

Figure 9A:
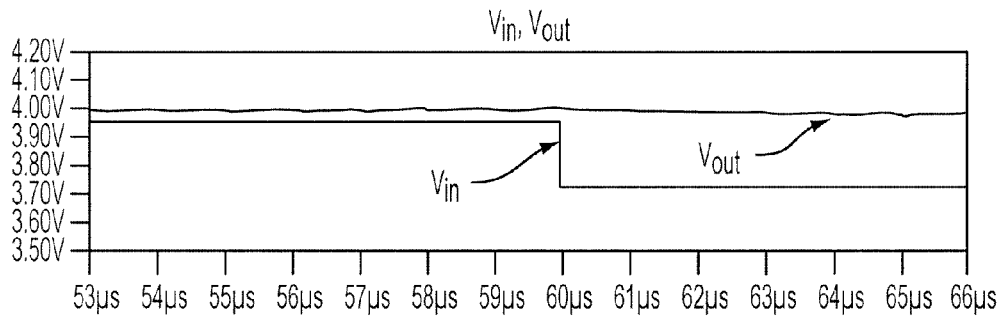
FIGS. 9A-9C illustrate operation of the boost converter of the present disclosure in response to a change in the input voltage from 3.95V to 3.7V.
Figure 9B:
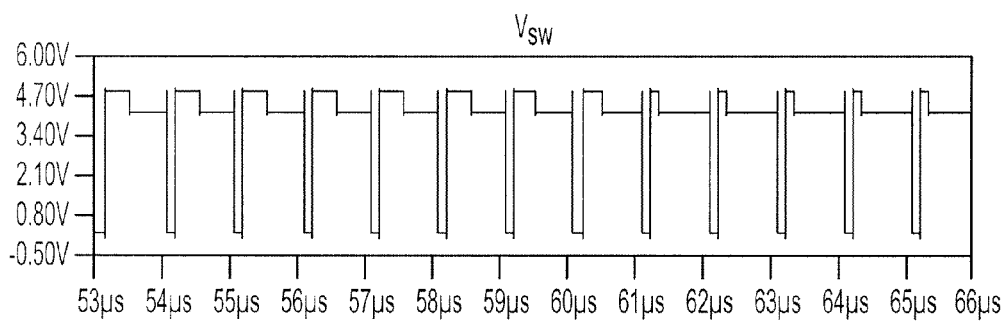
Figure 9C:
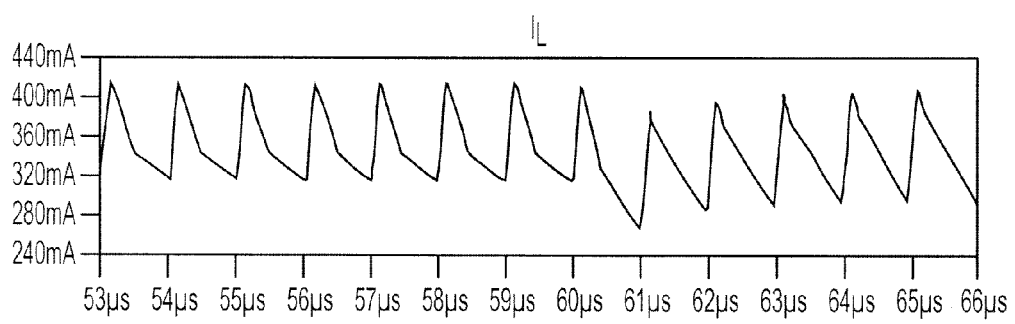

FIGS. 9A-9C illustrate simulation results representing a response of the synchronous boost converter 10 having the synchronous rectifier control circuit U2 shown in FIG. 6 to an input voltage step from 3.95V to 3.7V. When the input voltage Vin steps down to 3.7V, the reverse voltage is greater and the synchronous rectifier SW2 does not need to be turned off for as long as in the case of Vin=3.95V. This simulation shows that the circuit automatically responds to the reduced input voltage by keeping the synchronous rectifier SW2 on for a much longer duration once the input voltage drops.

Figure 10A:
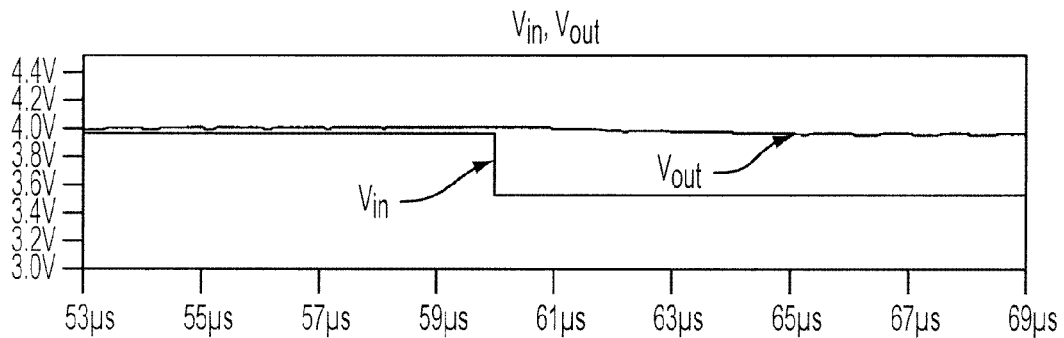
FIGS. 10A-10C illustrate operation of the boost converter of the present disclosure in response to a change in the input voltage from 3.95V to 3.5V.
Figure 10B:
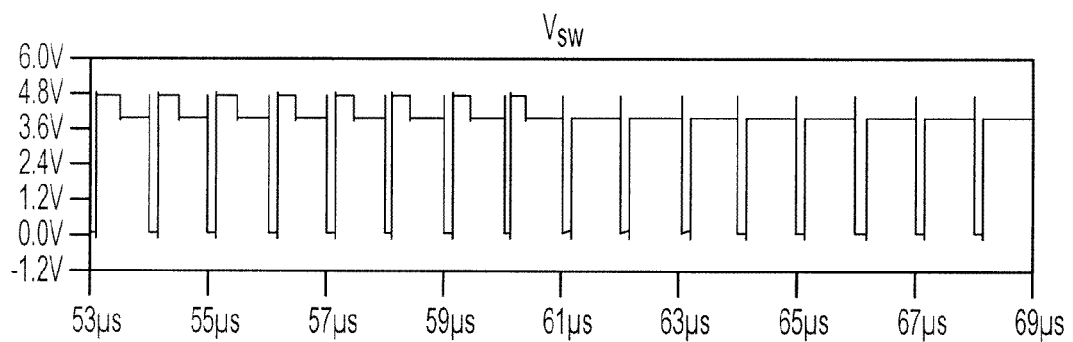
Figure 10C:
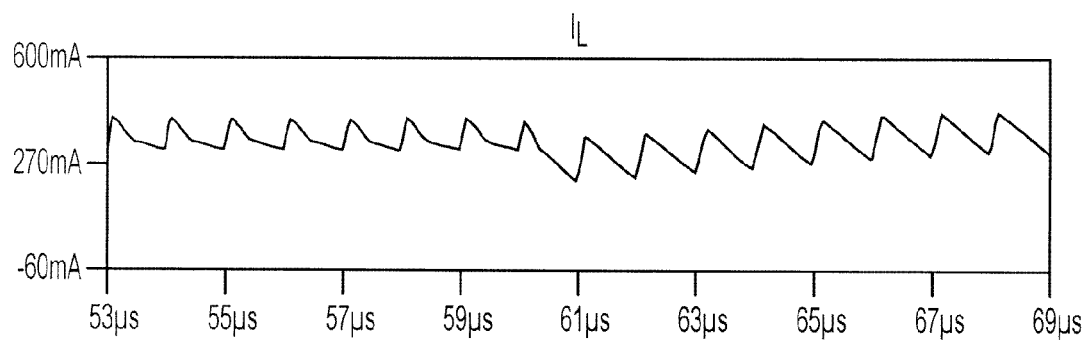

FIGS. 10A-10C illustrate simulation results representing a response of the synchronous boost converter 10 having the synchronous rectifier control circuit U2 shown in FIG. 6 when the input voltage Vin steps from 3.95V to 3.5V. With Vin=3.5V, the power switch on-time period is equal to 170 ns. In this example, Tmin may be set to 150 ns so as to enable the synchronous rectifier SW2 to remain on for the entire duration of the discharge phase i.e. the input-output voltage difference is sufficient to reset the inductor current without requiring the synchronous rectifier SW2 to turn off at all.

Figure 11A:
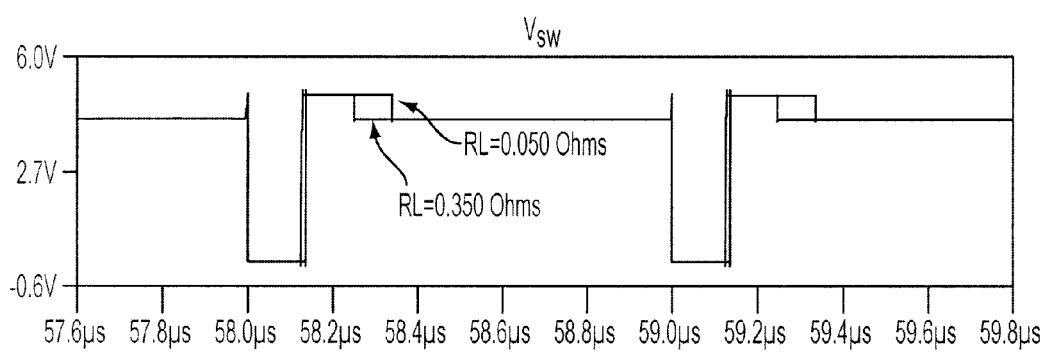
FIGS. 11A and 11B illustrate operation of the boost converter in response to a change in the series resistance of the inductor discharge path.
Figure 11B:
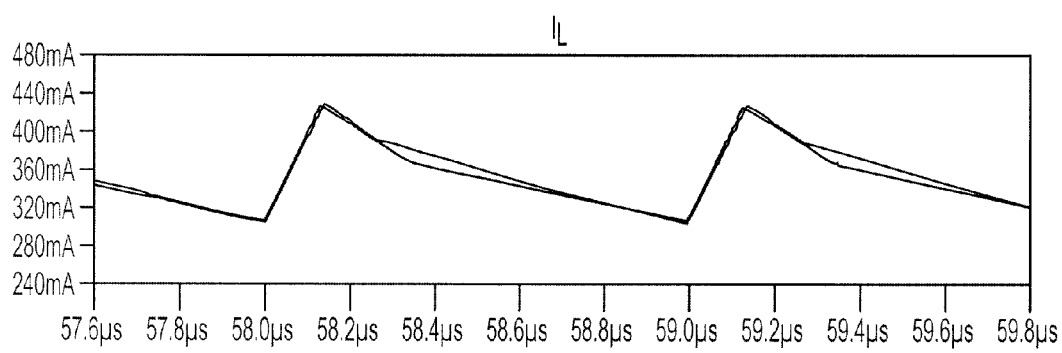

The simulation results in FIGS. 11A and 11B illustrate the ability of the synchronous boost converter 10 having the synchronous rectifier control circuit U2 shown in FIG. 6 to automatically compensate for changes in the series resistance of the inductor discharge path. In the first simulation, the inductor resistance RL was set to 50 mΩ. In the second simulation, this parameter was increased to 350 mΩ. With the higher-resistance inductor, less conduction time of SW2 is necessary to reset the inductor current. The control circuit U2 responds automatically to an increase in the resistance of the inductor L by reducing the time during which the synchronous rectifier SW2 is disabled.

It is noted that in a discontinuous conduction mode (DCM), the control circuit U2 in FIG. 6 may disable the synchronous rectifier SW2 for some amount of time whenever the power switch on-time is less then Tmin. As a result, the synchronous rectifier SW2 will get disabled even if Vin is much lower then Vout. This is obviously undesirable since it may reduce efficiency during DCM operation. To address this problem, the control circuit U2 may be disabled whenever the converter 10 operates in DCM. This disabling can be implemented by modifying control circuit U2 so that the synchronous rectifier SW2 is not controlled by the circuit U2 if the inductor current reached zero current during the last cycle. It is noted that in DCM, the inductor current can not build up because it discharges to zero each cycle. Therefore, the control circuit U2 can be safely disabled when the converter 10 operates in DCM.

The foregoing description illustrates and describes aspects of the present invention. Additionally, the disclosure shows and describes only preferred embodiments, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art.

The embodiments described hereinabove are further intended to explain best modes known of practicing the invention and to enable others skilled in the art to utilize the invention in such, or other, embodiments and with the various modifications required by the particular applications or uses of the invention.

Accordingly, the description is not intended to limit the invention to the form disclosed herein. Also, it is intended that the appended claims be construed to include alternative embodiment.

What is claimed is:

1. A synchronous boost DC/DC conversion system, comprising:
an input for receiving a DC input voltage, to which an inductor is coupled,
an output for producing a DC output voltage,
a power switch controllable to adjust an output signal of the conversion system,
a synchronous rectifier configurable to provide a conduction path between the inductor and the output, and
a control circuit for controlling the synchronous rectifier as the input voltage approaches or exceeds the output voltage, so as to adjust average impedance of the conduction path over a discharge period of the inductor,
wherein the control circuit is configured to adjust the average impedance in accordance with a conduction period of the power switch, the average impedance increases as the conduction period of the power switch decreases.

2. The system of claim 1, wherein the control circuit comprises an input circuit responsive to an on-signal representing the conduction period of the power switch.

3. The system of claim 2, wherein the input circuit is further responsive to a minimum on-time signal having a first logic state, a second logic state and a predetermined duration.

4. The system of claim 3, wherein the control circuit is configured for disabling the synchronous rectifier for duration of time proportional to a difference between the conduction period of the power switch and the predetermined duration of the minimum on-time signal.

5. The system of claim 3, wherein the minimum on-time signal defines a duty cycle at which the synchronous rectifier begins turning off.

6. The system of claim 3, wherein the predetermined duration is greater than a minimum conduction period of the power switch.

7. The system of claim 3, wherein the control circuit further comprises a charging circuit controlled by an output of the input circuit.

8. The system of claim 7, wherein the charging circuit is configured to begin charging when the power switch turns off and the minimum on-time signal is in the first logic state.

9. The system of claim 8, wherein the charging circuit is configured for charging at a pre-set fixed charging rate.

10. The system of claim 9, wherein the charging circuit is configured to begin discharging when the minimum on-time signal goes to the second logic state.

11. The system of claim 10, wherein the charging circuit is configured for discharging at a pre-set fixed discharging rate.

12. The system of claim 11, wherein the control circuit is configured to disable the synchronous rectifier until the charging circuit is discharged.

13. The system of claim 12, wherein the control circuit further comprises a first current source for producing current of a first current value that defines the pre-set fixed charging rate of the charging circuit.

14. The system of claim 13, wherein the control circuit further comprises a second current source for producing current of a second current value that defines the pre-set fixed discharging rate of the charging circuit.

15. The system of claim 14, wherein a ratio between the first current value and the second current value is selected so as to provide the conduction period of the synchronous rectifier sufficiently long to reset current in the inductor.

16. The system of claim 14, wherein a ratio between the first current value and the second current value determines a relationship between a conduction period of the synchronous rectifier and an amount by which the conduction period of the power switch is shorter than the predetermined duration of the minimum on-time signal.

17. A synchronous boost DC/DC conversion system, comprising:
an input for receiving a DC input voltage, to which an inductor is coupled,
an output for producing a DC output voltage,
a power switch controllable to adjust an output signal of the conversion system,
a synchronous rectifier configurable to provide a conduction path between the inductor and the output, and
a control circuit for controlling the synchronous rectifier as the input voltage approaches or exceeds the output voltage, so as to adjust average impedance of the conduction path over a discharge period of the inductor,
wherein the control circuit is configured to disable the synchronous rectifier for duration of time corresponding to a conduction period of the power switch, the duration of time during which the synchronous rectifier is disabled increases as the conduction period of the power switch decreases.

18. The system of claim 17, wherein the control circuit is configured to disable the synchronous rectifier for a duration of time proportional to a difference between the conduction period of the power switch and a pre-set time period.

19. The system of claim 18, wherein the pre-set time period defines a duty cycle at which the synchronous rectifier begins turning off.

20. The system of claim 18, wherein the pre-set time period is greater than a minimum conduction period of the power switch.

21. A method of converting a DC input voltage into a DC output voltage using a power switch, inductor and a synchronous rectifier, the method comprising the steps of:
controlling the power switch to adjust the output voltage, and
as the input voltage approaches the output voltage, adjusting average impedance of the synchronous rectifier over a discharge period of the inductor,
wherein the average impedance is adjusted in accordance with a conduction period of the power switch, the average impedance increases as the conduction period of the power switch decreases.

22. The method of claim 21, wherein the average impedance of the synchronous rectifier is adjusted by disabling the synchronous rectifier for a duration of time proportional to a the conduction period of the power switch.

23. The method of claim 22, including increasing the duration during which the synchronous rectifier is disabled, as the conduction period of the power switch becomes shorter.

24. The method of claim 23, wherein the duration during which the synchronous rectifier is disabled, is increased to prevent the conduction period of the power switch from reaching a predetermined minimum value.

* * * * *